United States Patent
Canada et al.

(10) Patent No.: US 6,757,660 B2
(45) Date of Patent: *Jun. 29, 2004

(54) METHOD FOR ANALYZING INFORMATION TO PROVIDE AN OBJECTIVE ASSESSMENT OF A PREDEFINED SUBJECT

(75) Inventors: Eric P. Canada, Wheaton, IL (US); Nancy A. Blane, Wheaton, IL (US)

(73) Assignee: Blane, Canada Ltd., Wheaton, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,352

(22) Filed: Aug. 26, 1999

(65) Prior Publication Data

US 2003/0033188 A1 Feb. 13, 2003

(51) Int. Cl.⁷ ............................................. G06F 17/60
(52) U.S. Cl. ............................................. 705/7; 705/10
(58) Field of Search ................................. 705/7, 10, 3

(56) References Cited

U.S. PATENT DOCUMENTS

| | | | | |
|---|---|---|---|---|
| 5,335,180 A | * | 8/1994 | Takahashi et al. ........... | 701/117 |
| 6,389,400 B1 | * | 5/2002 | Bushey et al. ................ | 705/7 |
| 6,411,961 B1 | * | 6/2002 | Chen .......................... | 707/102 |

FOREIGN PATENT DOCUMENTS

DE  3417417 A1 * 11/1985 ........... G07C/13/00

OTHER PUBLICATIONS

Surridge, Robert W. et al, Using Industry Clustering for Business Retention and Expansion, Fall 1997, Economic Development Review, vol. 15 Issue 3, pp. 20–22. [PROQUEST].*

* cited by examiner

*Primary Examiner*—James P. Trammell
*Assistant Examiner*—Andre D. Boyce
(74) *Attorney, Agent, or Firm*—Brinks Hofer Gilson & Lione

(57) ABSTRACT

A method for evaluating the relative importance for a predefined subject of predefined core characteristics. To evaluate the importance of the predefined subject, a first data set is created that contains information inquiries, wherein each information inquiry is related to one or more of the predefined core characteristics. A second data set is created that contains responses to the information inquiries. Thereafter, a matrix analysis is performed using the first and second data sets to generate an importance value for each predefined core characteristic.

11 Claims, 21 Drawing Sheets

Linear Analysis

Question ⟶ Answer ⟶ Conclusion

Example 1

On-Site Visit Form

| | |
|---|---|
| Old record: | Appointment contact: April Townsend |
| Company name: Gateway Co. | Work phone: (630) 495-8120 |
| Contact name: Waters, Mary | Assisted by: |
| Survey collected by: Corbin, Laura | Organization: |
| Date of visit: 5/18/98 | |

1. Company's greatest achievement:
2. Where is primary product in its Life Cycle | Emerging | Growing | Maturing | Declining
3. New products introduced in last 5 yrs | Yes | No
4. New products anticipated for next 2 yrs | Yes | No
5. New technology emerging in product | Yes | No New technology explain:

6. As a percent of sales, how much does the company spend on R&D?  0% (no R & D)
7. As a percent, how is R&D budget divided between:
    R&D New Service/Product Development: 0 %
    R&D Service/Product Improvement: 0 %
    R&D Production Improvement: 0 %
8. Where is company R&D facility located:

Market
9. Company's primary market | Local | Regional | National | International
10. Total company sales | Increasing | Stable | Decreasing
11. Market share of key products | Increasing | Stable | Decreasing ©1999 Blane, Canada LTD.

FIG. 3A

On-Site Visit Form

12. Plan to expand in next 3 yrs [Yes] [No]
    Estimated dollar investment: $0.00
    Estimated # jobs created: 0
    Estimated increase in sq.ft: 0 sq.ft.
13. Export sales [Increasing] [Stable] [Decreasing] [None]
14. Product imports [Increasing] [Stable] [Decreasing] [None]
15. Does company have overseas production? [Yes] [No]
    Contract Production? [Yes] [No]
    Company Facility? [Yes] [No]
    Overseas Locations:

Industry
16. What % of U.S. market share is held by international competitors:
    Country of primary competitors:
17. Is production by U.S. competitors [Increasing] [Stable] [Decreasing]
    Why:
18. Is Merger activity in your industry [Increasing] [Stable] [Decreasing]
19. Is production in your industry [Under Capacity] [Balanced] [Over Capacity]
20. Anticipate adverse regulation changes [Yes] [No]

What changes:
    Affect on company:

©1999 Blane, Canada LTD.

FIG. 3B

| Microsoft Access - [Synchronist] |
|---|

| File | Edit | View | Insert | Format | Records | Tools | Window | Help |
|---|---|---|---|---|---|---|---|---|

On-Site Visit Form

Add a Record | Find | Find Next

21. Anticipate beneficial regulation changes  [Yes] [No]
    What changes:
    Affect on company:

Management

22. Projected employment needs    [Increasing] [Stable] [Decreasing]
23. Projected utility needs    [Increasing] [Stable] [Decreasing]
    If increasing, which   [Water] [Sewer] [Natural Gas] [Electricity] [Telecommunication]
24. Is current facility adequate for future operations [Yes] [No]
    Why:
25. Community strengths:
26. Community weaknesses:
27. Any barriers to company growth in this community    [Yes] [No]
    What barriers 28. Headquarter execs attitudes differ from local excess community    [Yes] [No]
    as place to do business
    If so, explain:
    If yes, Why:
29. Any reason community would not be considered for expansion    [Yes] [No]

Workforce            "1=low, 5=high"

30. Availability of workers    [1] [2] [3] [4] [5]

Form View

Start | Microsoft Access - [Synchronist]      1:47 PM

©1999 Blane, Canada LTD.

FIG. 3C

On-Site Visit Form

Workforce  "1=low, 5=high"

| # | Question | Options |
|---|---|---|
| 30. | Availability of workers | 1 2 3 4 5 |
| 31. | Quality of workers | 1 2 3 4 5 |
| 32. | Stability of workforce | 1 2 3 4 5 |
| 33. | Compared to other facilities production of workforce | 1 2 3 4 5 |
| 34. | Unfilled positions | Increasing / Stable / Decreasing |
| 35. | Experiencing recruitment problems with any positions | Yes / No |
|     | What positions: | |
| 36. | Are recruitment problems limited to this community | Industry / Community |
| 37. | Is company investment in training | Increasing / Stable / Decreasing / does not |
| 38. | Percentage of investment in new skills training: | 0 % |
| 39. | Percentage of investment in remedial training: | 0 % |

Marketing Information

40. Are there suppliers that would benefit by being closer to facility — Yes / No
    Company and location:
41. Are there clients that would benefit by being closer to facility — Yes / No
    Company and location:
42. Please rate the quality of the following services   "1 = low, 5 = high"

| Service | Rating |
|---|---|
| Police protection | 1 2 3 4 5 does not |
| Fire protection | 1 2 3 4 5 does not |

©1999 Blane, Canada LTD.

FIG. 3D

On-Site Visit Form

40. Are there suppliers that would benefit by being closer to facility [Yes] [No]

Company and location: _____

41. Are there clients that would benefit by being closer to facility [Yes] [No]

Company and location: _____

42. Please rate the quality of the following services     *1=low, 5=high*

| Service | 1 | 2 | 3 | 4 | 5 | |
|---|---|---|---|---|---|---|
| Police protection | 1 | 2 | 3 | 4 | 5 | does not |
| Fire protection | 1 | 2 | 3 | 4 | 5 | does not |
| Paramedic program | 1 | 2 | 3 | 4 | 5 | does not |
| Traffic control | 1 | 2 | 3 | 4 | 5 | does not |
| Public transportation | 1 | 2 | 3 | 4 | 5 | does not |
| Sewage handling | 1 | 2 | 3 | 4 | 5 | does not |
| Water quality | 1 | 2 | 3 | 4 | 5 | does not |
| Schools | 1 | 2 | 3 | 4 | 5 | does not |
| Property tax assessment | 1 | 2 | 3 | 4 | 5 | does not |
| Planning | 1 | 2 | 3 | 4 | 5 | does not |
| Regulatory enforcement | 1 | 2 | 3 | 4 | 5 | does not |
| City/Village services | 1 | 2 | 3 | 4 | 5 | does not |
| County services | 1 | 2 | 3 | 4 | 5 | does not |

Notes:

©1999 Blane, Canada LTD.

FIG. 3E

Company Background Report

18-May-98

Company Name: _____
Previous Name: _____
Parent Company Name: _____
Address: _____
City/State/Zip: _____
Phone: _____ Fax: _____

Last Updated: _____          Visit Priority: _____
Parent Affiliation: _____    Date Of Next Visit: _____
                                  Years In Business: _____
                                  Year Est. In Community: _____
                                  Fiscal Year: _____

Facility Type:
○ Headquarters  ○ Division  ○ Office Operation  ○ Branch Plant  ○ Distribution  ○ Manufacturing Ownership: _____
Primary Products: _____
SIC/NAICS:

Business sector: _____

Other company owned facilities in the region:
○ Headquarters  ○ Division  ○ Office Operation  ○ Branch Plant  ○ Distribution  ○ Manufacturing
Where: _____

Additional company _____
facilities making same _____
or similar products: _____

Total local employment:
- Full time: _____
- Part time: _____
- Leased: _____
- EmpTotal: _____

Local employment by function:
- Production: _____
- Technical: _____
- Clerical: _____
- Management: _____

Jobs added or lost in past 3 years: _____
Shifts per day: _____
Shifts per week: _____
Peak employment season: _____

©1999 Blane, Canada LTD.

FIG. 4A

Company Background Report
18-May-98

Primary union: _____
Other union representation: _____

Union activity:
- ○ No unions
- ○ Positive working relationship  ○ Organization activities  ○ Certification
- ○ Decertification  ○ Strike or lockout  ○ Strike or lockout Acreage: _____  Age of building: _____
Building size in sq.ft.: _____  Condition of building: _____
Space added or deleted in last 3 yrs: _____
Past expansion date Type of expansion:

_____  _____
_____  _____
_____  _____

Room for additional expansion at this location: _____
Own or lease: _____  Lease expiration date: _____
Property owner: _____
Note:

_____

©1999 Blane, Canada LTD.

FIG. 4B

Post Visit/Interviewer Report
04-Feb-99

| Company Name | City/State | Date of Visit |
|---|---|---|
| American Insurance Fabricators | Warrenville, IL | 4/13/98 |

1. Do you have any reason to believe this company's role in the community could be changing?
   Real estate could cause them to move if it is not resolved.
2. Is there any reason to believe this company it at risk of leaving the community?
   Yes, real estate, there are no other buildings in the area with enough space to handle their full requirement - 200,000 sq.ft. They may be willing to build. Need to explore site options with them.
3. Is the company or its executives undergoing any form of stress that could be of concern for the company's stability in the community?
   Growing pains
4. Does this executive the support the community as a place to do business? (1 Low- 5 High)

| 1 | 2 | 3 | 4 | 5 |
   |---|---|---|---|---|
   | O | O | O | O | ◉ |

5. Is this executive a candidate for working with the economic development program in some capacity?

| 1 | 2 | 3 | 4 | 5 |
   |---|---|---|---|---|
   | O | O | O | O | ◉ |

(1Low- 5 High)

Interviewer: Nancy A. Blane
Organization name: Blane, Canada Ltd.
Notes:

©1999 Blane, Canada LTD.

CS-b5
Facility Type Branch Plant
2 = Yes
0 = No

+

CS-b6
Facility Type Distribution
1 = Yes
0 = No

+

CS-1
Total Employees
1 = < 20
2 = 21 To 50
3 = 51 To 250
4 = 251 To 450
5 = 451 To 700
6 = 701 To 1000
7 = 1001 To 1500
8 = 2001 To 3000
10 = > 3000

+

CS-f
Company Type Of Ownership
1 = Public
2 = Employee Owned
3 = Private
4 = Family
5 = Non-profit
6 = State Government
7 = Federal Government

+

CS-n
Company Added Or Lost In The Last Three Years
2 = > 0
-2 = < 0
0 = = 0

+

CS-s1
Union Representation
0 = Yes
4 = No

+

CS-s1
Union Representation
0 = Yes
4 = No

+

CS-s2
Union Positive Relationship
2 = Yes
0 = No

+

Go to CV3

CV3

CS-s3
Union Decertification
1 = Yes
0 = No

+

CS-s4
Union Certification Activities
-1 = Yes
0 = No

+

CS-s5
Union Certification
-1 = Yes
0 = No

+

CS-s6
Union Strike / Lockout
-1 = Yes
0 = No

+

CS-s7
Union Arbitration
-1 = Yes
0 = No

+

CS-X
Space +/- In The Last Three Years
1 = > 0
-1 = < 0
0 = = 0 next

Add 16 And Divided by 95
Normalizes Value To 100 next

Return Calculated Value
To Company Table

©1999 Blane, Canada LTD.

OS-Q#13
Export Sales
3 = Increasing
0 = Stable
-2 = Decreasing
-1 = No Exports

+

OS-Q#14
% Components Imported
-1 = Increasing
0 = Stable
3 = Decreasing
2 = No Imports

+

OS-Q#20
Industry Production
3 = Under capacity
0 = Balanced
-1 = Over capacity

+

OS-Q#21
Is there any adverse tax legislation in next five years
-1 = Yes
1 = No

+

OS-Q#22
Is there any beneficial tax legislation in next five years
2 = Yes
0 = No

+

OS-Q#24
Employment needs
3 = Increasing
2 = Stable
1 = Decreasing

Go to GV3

GV3

OS-Q#24
Employment needs
3 = Increasing
2 = Stable
1 = Decreasing

+

OS-Q#25
Utility Needs
3 = Increasing
2 = Stable
1 = Decreasing

+

OS-Q#26
Facilities adequate for anticipated future operations
0 = Yes
2 = No

+

CS-n
Company added or lost in the last three years
2 = > 0
-2 = < 0
0 = = 0

+

CS-x
Space +/- in the last three years
1 = > 0
-1 = < 0
0 = = 0

+

CS-z
Room for Expansion
1 = Yes
-2 = No

Next
Go to GV4

GV4

Add 14 and divide by 67 normalizes value to 100

Next

Return calculated value to company table

©1999 Blane, Canada LTD.

FIG. 8B-2

Solving for Satisfaction Value

| Satisfaction Value = |
|---|

OS-Q#24
Employment Needs
3 = Increasing
2 = Stable
1 = Decreasing
+

OS-Q#25
Utility Needs
3 = Increasing
2 = Stable
1 = Decreasing
+

OS-Q#26
Facilities adequate for anticipated future operations
0 = Yes
2 = No
+

OS-Q#29
Are there barriers to growth in the community
-1 = Yes
1 = No
+

OS-Q#30
Do Executives differ in attitude then local management
-1 = Yes
1 = No
+

OS-Q#31
May the community not be considered for expansion
-2 = Yes
1 = No
+

OS-Q#32
Availability of Workers
Low            High
1   2   3   4   5
+
Go to SV1

SV1

OS-Q#33
Quality of Workforce
Low            High
1   2   3   4   5
+

OS-Q#34
Stability of Workforce
Low            High
1   2   3   4   5
+

OS-Q#35
Productivity at facility
Low            High
1   2   3   4   5
+

OS-Q#36
Unfilled positions
1 = Increasing
2 = Stable
3 = Decreasing
+

OS-Q#37
Are there recruiting problems
0 = Yes
1 = No
+

OS-Q#38
Recruiting problems attributed to
2 = Industry
1 = Community
+

OS-Q#39
Employee Training
4 = Increasing
3 = Stable
2 = Decreasing
0 = No Training
+
Go to SV2

SV2

OS-Q#43a
Rate Police protection
Does not apply = 0
Low            High
1   2   3   4   5
+

OS-Q#43b
Rate Fire protection
Does not apply = 0
Low            High
1   2   3   4   5
+

OS-Q#43c
Rate Ambulance Service
Does not apply = 0
Low            High
1   2   3   4   5
+

OS-Q#43d
Rate Traffic control
Does not apply = 0
Low            High
1   2   3   4   5
+

OS-Q#43e
Public transpiration
Does not apply = 0
Low            High
1   2   3   4   5
+

OS-Q#43f
Rate Sewage treatment
Does not apply = 0
Low            High
1   2   3   4   5
+

OS-Q#43g
Rate Water quality
Does not apply = 0
Low            High
1   2   3   4   5
+
Go to SV3

©1999 Blane, Canada LTD.

FIG. 8D-1

Company Analysis
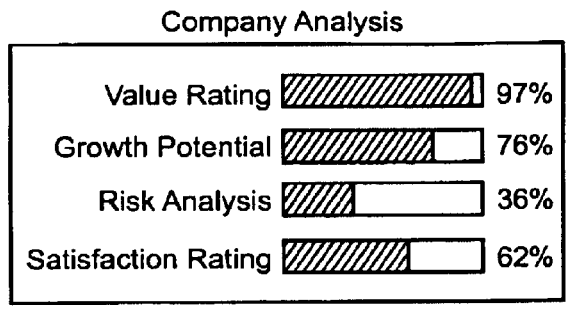
| | |
|---|---|
| Value Rating | 97% |
| Growth Potential | 76% |
| Risk Analysis | 36% |
| Satisfaction Rating | 62% |
FIG. 9A
Company Table
Company Assessments Inventory
| Company | V | G | R | S |
|---|---|---|---|---|
| AA Corporation | 98 | 85 | 32 | 76 |
| ABC Aircraft | 60 | 58 | 50 | 58 |
| Advanced Data | 75 | 69 | 35 | 60 |
| American Ins. | 97 | 76 | 36 | 62 |
| Anheiser Publ. | 73 | 68 | 42 | 63 |
| Flint-Pro, Inc. | 46 | 27 | 60 | 48 |
| Gateway Co. | 35 | 18 | 63 | 19 |
| GRM USA | 89 | 90 | 24 | 59 |
| Hi Q Corp. | 89 | 76 | | |
| JK Sports Eq. | | | | |
FIG. 9B
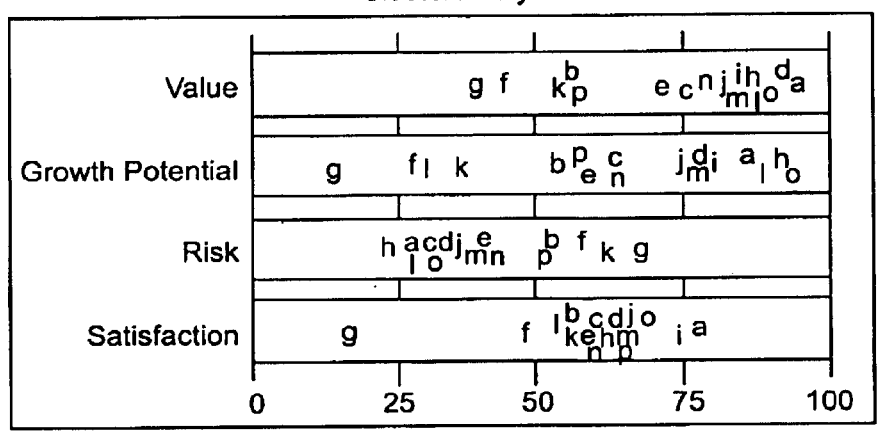
FIG. 9C

METHOD FOR ANALYZING INFORMATION TO PROVIDE AN OBJECTIVE ASSESSMENT OF A PREDEFINED SUBJECT

REFERENCE TO APPENDIX

An appendix is included of a computer program listing. The total number of pages is four.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally concerns techniques which provide an objective assessment of a predefined subject. More specifically, the present invention concerns the assessment of the predefined subject utilizing predefined core characteristics whose analysis depends on information inquiries.

BACKGROUND OF THE INVENTION

Information analysis is an important tool that is used by various entities such as governments, businesses, universities and individuals, to aid in their choice of a future course of action. In this regard, entities often collect and manage huge amounts of information. Entities utilize this information in multiple endeavors such as predicting trends in the stock market, forecasting the weather, and determining whether or not a business is likely to succeed in a certain community. The value of the information utilized by the entities, however, relates directly to how well the information is analyzed. In other words, the better the analysis, the more accurately entities can predict the future event.

To acquire information for analysis, surveys are often used. Thereafter, known techniques to analyze survey information vary. For example, a traditional linear analysis tabulates and analyzes answers to a question independently of other questions. Therefore, linear analysis typically ends with a pie chart or a bar graph representing data for a single question, as shown in FIG. 1. A problem exists in that it is often difficult to determine what questions to ask. In addition, the findings often produce a lack of insight and depend on an interviewer's skill. Moreover, the questions asked do not relate to one another in a meaningful way.

Another known analyzing technique is cross-tab analysis. Cross-tab analysis attempts to determine whether two or more variables are independent of each other or associated. During cross-tab analysis, a question is subdivided into categories such as age ranges, professional affiliation and industry type. Cross-tab analysis attempts to determine whether a response changes as the respondent's group changes. Thereafter, given a predetermined expectation for each variable, a researcher compares each outcome of the cross-tab analysis to an expected outcome.

A problem exists with known analysis techniques when an answer to a core question, or a conclusion to a core characteristic, depends on the answers of more than one inquiry. For example, several questions are necessary to adequately define a core characteristic when there is a need to better understand a company and the company's industry within a community. This problem is further complicated when the information inquiries provide subjective information that is not equally important to the conclusion of the core characteristics. Neither linear analysis nor cross-tab analysis accommodates such situations.

Accordingly, there is a need for a method of analysis which provides for an evaluation of a predefined subject which is described in terms of predetermined core characteristics. In addition, there is a need for a method of analysis that correlates multiple information inquiries to one or more core characteristic. Moreover, there is a need for a method of analysis that accommodates weighting of the information inquiries and the outcome of the analysis does not depend on the skill of the interviewer.

BRIEF SUMMARY OF THE INVENTION

Such needs are met or exceeded by the present method of matrix analysis. A method for information analysis is shown and described which accommodates answers to core questions, even when the answers depend on information from multiple inquiries, and the importance of the different inquiries varies.

More specifically, the present invention evaluates the importance of the predefined subject utilizing a first data set that contains general characteristics describing the subject. Moreover, the present matrix analysis utilizes a second data set that contains information inquiries. Each information inquiry is related to one or more of the predefined core characteristics of the subject. Thereafter, matrix analysis is performed using the first and second data sets to generate an importance value for each predefined core characteristic.

BRIEF DESCRIPTION OF THE DRAWINGS

Other features and advantages of the invention will be apparent to those skilled in the art with reference to the detailed description and the drawings, of which:

FIGS. 3A–3E shows a computer input screen of an exemplary on site visit form with example information inquiries according to the matrix analysis of the present invention;

FIGS. 4A and 4B show an exemplary background report form containing information inquiries relating to the background information of the company according to the matrix analysis of the present invention;

FIG. 5 shows an exemplary post visit interviewer report that supports an analysis according to the matrix analysis of the present invention;

FIGS. 9A–9C depict representative analysis reports according to the matrix analysis of the present invention.

DETAILED DESCRIPTION OF THE INVENTION

The present invention method of analysis analyzes data in a way that the core characteristics for a predefined subject are answered by utilizing an array of information inquiries. The information inquiries possess differing levels of importance to determining the core characteristic. The predefined subject is a matter for thought, action, or study, such as sales, economic development, investing and key account management. It should be appreciated that, while the method of the present invention can be utilized over a wide range of predefined subjects, to simplify an explanation of the invention, the invention is described in terms of rating whether or not a company benefits a community.

Within every predefined subject, there exists one, two, three, four or more defining elements, e.g., core characteristics. Core characteristics are often questions that cannot be addressed directly with the company's representative. For example, in equity investment, core characteristics can include management, return on equity and sales growth. As discussed herein, the core characteristics used to determine whether the company benefits the community are the company's value to the community, growth potential, relative level of risk of a change in status, e.g., downsizing or leaving the community, and satisfaction with the community. Of course other core characteristics could be analyzed such as the company's barriers to growth in the community and marketing opportunities.

Figure 1:
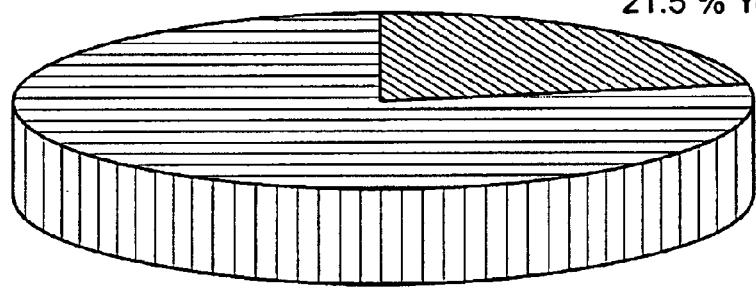
FIG. 1 shows a pie chart produced using known linear analysis.
Figure 2:
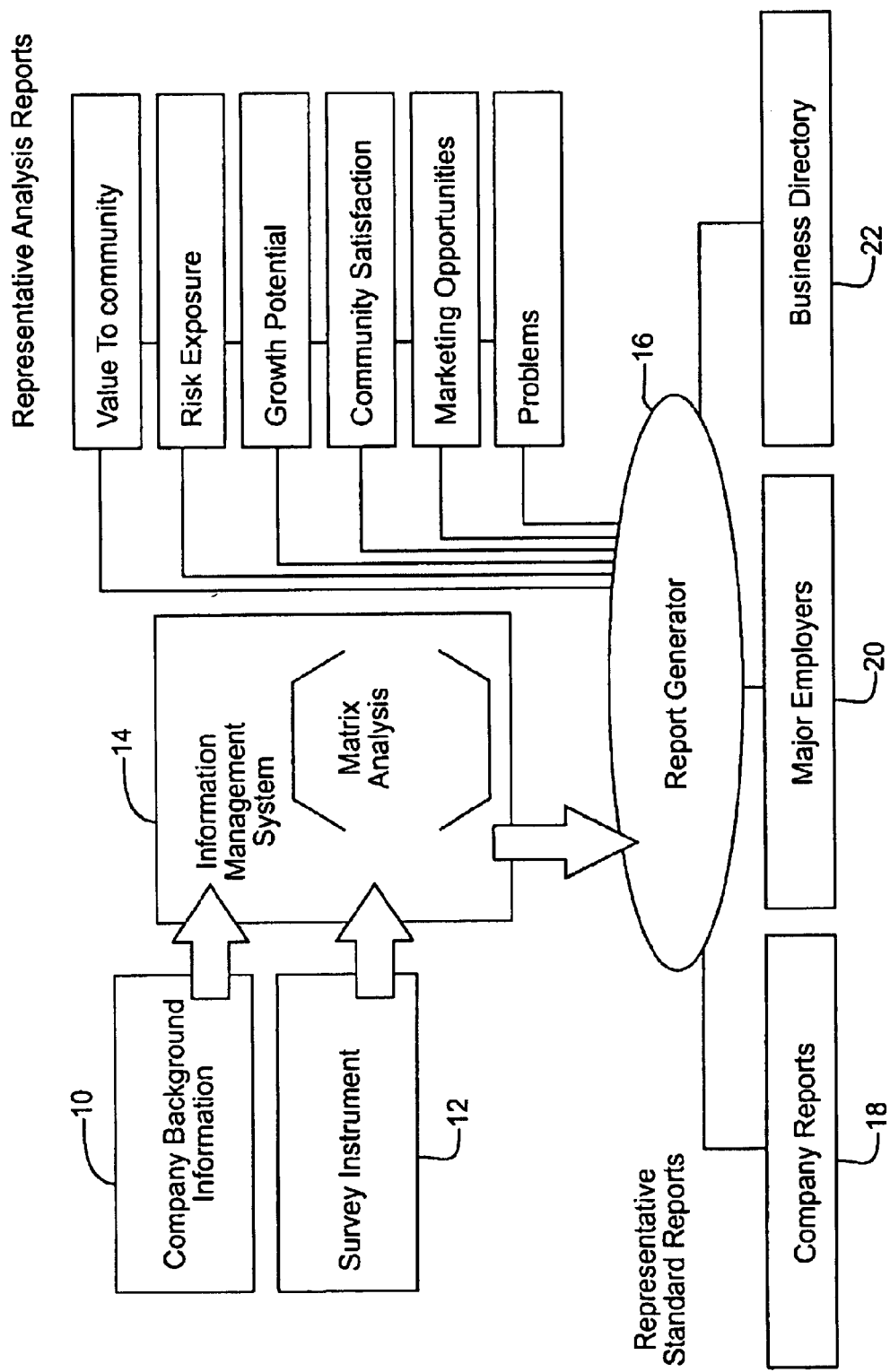
FIG. 2 shows a block diagram representing the matrix analysis of the present invention, and inputs and outputs of that analysis.

Referring to the drawings, and in particular FIG. 2, to understand the core characteristic, two types sources are shown, background information (block 10) and survey information (block 12), which gather the array of information inquiries. On the one hand, background information (block 10) includes statistics that help describe a subject and make the subject a member of a group. Typically, background information is already known or is indirectly available from various public sources. Background information includes company employment, sales volume, form of ownership and relationship to a parent company. On the other hand, survey information (block 12) focuses on the collection of information gathered from direct information inquiries, e.g., a written survey or via a personal interview, about the core characteristics of the subject.

Each information inquiry provides insight into at least one core characteristic, but no single inquiry exists where the answer will fully explain the core characteristic. As a result, many inquiries are possible, each providing only partial insight into understanding the core characteristic, and some inquiries providing more information than other questions. Preferably, the information inquiries are selected because they provide insight into at least two of the core characteristics. The order of asking the information inquiries can vary, however, it is preferred to present the information inquiries in a rational order to save time in gathering the information.

Using known survey instrument design techniques, individual questions are shaped into easily understood questions that preferably elicit consistent, reliable information from each respondent. To elicit consistent and reliable information, survey designers utilize several drafting criteria. For example, inquiries are in the form of multiple choice options or close-ended questions are formatted to insure accurate information. The information inquiries should not lead the respondent to choose one response over others. Inquiries should not threaten the respondent by asking for sensitive information. Furthermore, each question is tested and the questions are organized in a logical sequence for comfortable presentation in the survey instrument.

In addition to the above described drafting criteria, final selection of information inquiries is based on a correlation of the information inquiry with the core characteristics and the ability of the information inquiry to contribute to more than one core characteristic. Typically, the core characteristic is described in terms of direct and indirect indicators. For example, utilizing the core characteristic value to the community, information inquiries preferably should be chosen to explore both the company's direct and indirect value to the community. For direct value, the information inquiries could include total employment, total payroll, total taxes paid locally, volume of local purchases, active corporate philanthropy and growth and/or growth potential. Similarly, indirect value contributions could be measured in terms of encouraging employee involvement in the community, drawing new skilled employees and residents to the community, lending prestige to the community through a prominent role in the corporate structure and prominence in their industry.

Referring to FIGS. 3A–3E, an exemplary on site visit form with example information inquiries is shown as custom built application screen shots utilizing a MICROSOFT ACCESS® platform. It can be appreciated that other forms for viewing the information inquiries and storing answers to the information inquiries are contemplated. Exemplary question one is an open-ended question which asks for the company's greatest achievement. Question two is a closed ended question which inquires about a life cycle position of the company's primary product, e.g., emerging, growing, maturing or declining. Exemplary question three is a closed ended yes/no answer question that queries whether new products have been introduced within the last five years.

Referring to FIGS. 4A and 4B, an exemplary background report form is shown which contains information inquiries relating to the background information of the company. Background inquiries include a close-ended question about the facility type, e.g., as a headquarters, division, office operation, branch plant, distributor and manufacturer.

Referring to FIG. 5, an exemplary post visit interviewer report is shown which asks open ended and close-ended questions. An example of a close-ended question is whether an interviewed executive supports the community as a place to accomplish business. The support level is ranked from one to five, with one being a low level of support and five being a high level of support. While data from the post interviewer report is not utilized for the matrix analysis, the post interviewer report supplies users with valuable information regarding the acquisition of on site information. For example, the post visit interviewer report provides operation management functions, so that managers can experience conditions of the on site interview. In addition, the post visit interviewer report provides for follow-up tracking, e.g., a notation to obtain additional on site information.

Referring to FIGS. 3–5, the on site visit form, the background report and the post visit interviewer report combine to supply the array of information inquiries. As described below, different combinations of the information inquiries are used to describe the core characteristics. In addition, some information inquiries are only utilized as material in reports, and do not provide answers to the core characteristics, such as whether an interviewer believes the company is at risk of leaving a community (FIG. 5).

Figure 6:
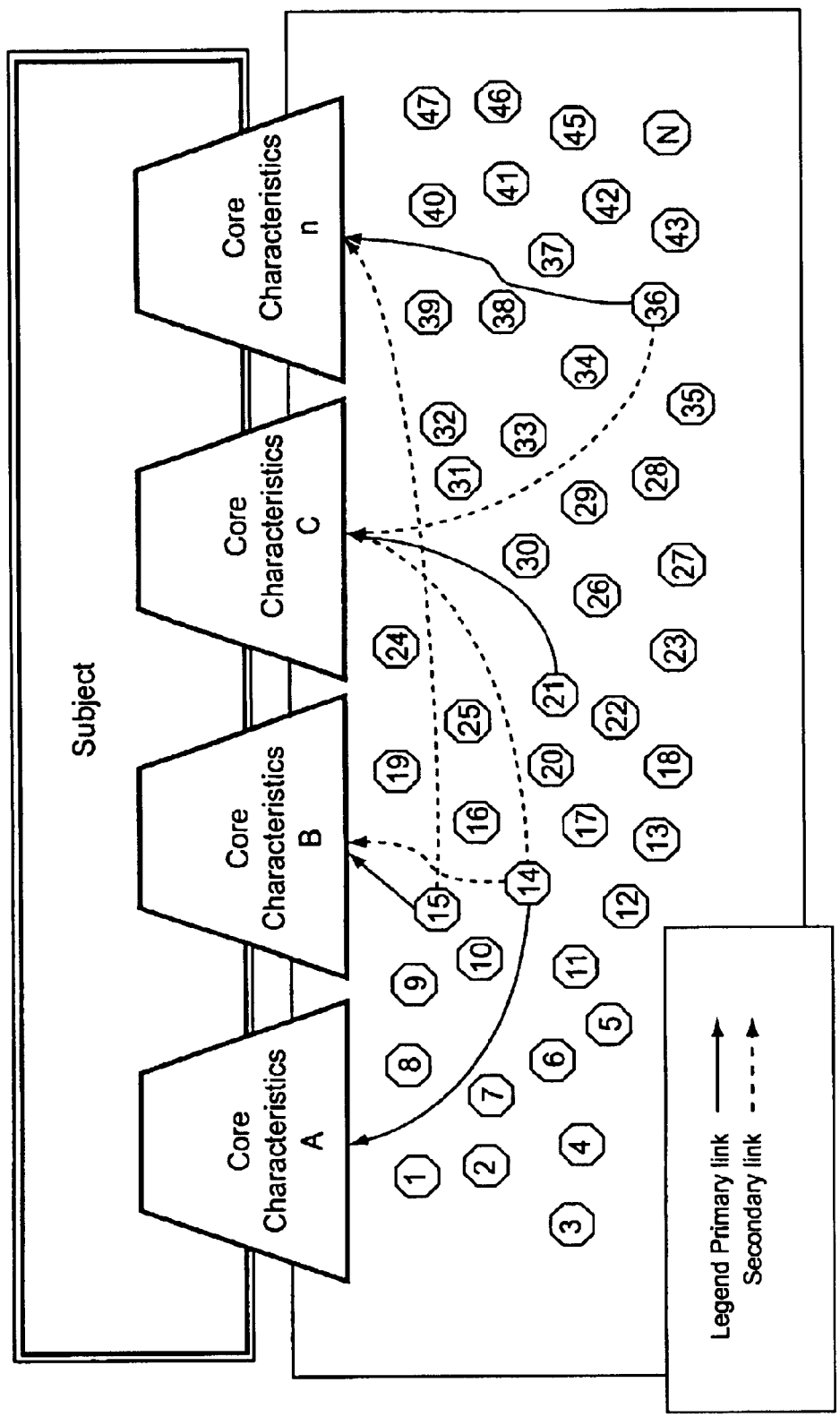
FIG. 6 depicts a relationship between a predefined subject, core characteristic and information inquiries according to the matrix analysis of the present invention.

Referring to FIG. 6, a relationship is shown between a predefined subject, core characteristic A-n and information inquiries 1-N. A degree of correlation between the information inquiry 1-N and the core question A-n can be strong, weak or obtain no correlation. When the correlation is strong, the inquiry links via a primary link to the corresponding core characteristic, as shown with a solid arrow. In addition, when the correlation is weak, the inquiry links via a secondary link to the corresponding core characteristic, as shown by the dashed arrow. If no correlation exists between the inquiry and the core characteristic, however, the inquiry does not link to the core characteristic.

Figure 7:
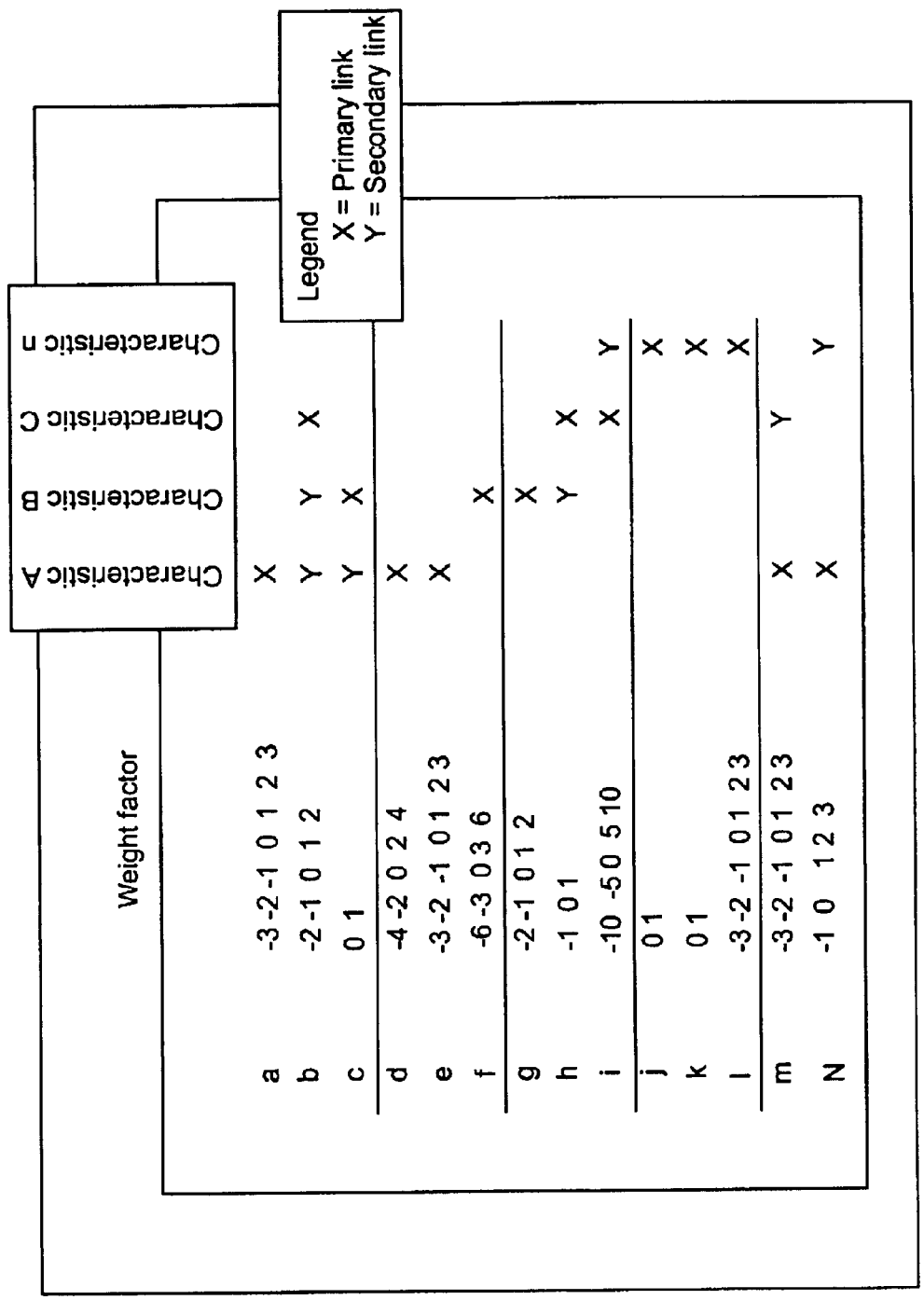
FIG. 7 shows that each information inquiry may link to one or more core characteristics according to a preferred embodiment of the present invention matrix analysis.

Referring to FIG. 7, it follows that each inquiry a-N may link to one or more core characteristics A-n, as shown. After information inquiries are conceived, they are ranked from a highest correlation to a lowest correlation, with regard to the core characteristics A-n. A range of weight factors depends of the information inquiry's level of correlation to the core characteristic A-n. Thus, an information inquiry a-N may have a wide range of weight factors, e.g., inquiry i, or a small range of weight factors, e.g., inquiry c.

In the simplest information inquiry form, a yes/no question has two different weights. If "yes" is the answer to a higher correlated inquiry, the response "yes" for that inquiry could get a weight of +5, for example. If "yes" is the desired response, a "no" response receives a lower weight. The "no" weight factor could be any number lower than +5, for example, +4, 0, or −5. Since some inquiries have a higher correlation to the core characteristic, a proper weighting range is selected to reflect the inquiry's appropriate level of influence compared to other inquiries considered in the analysis. A total number of inquiries contributing to the understanding of a core characteristic also help to determine the weight factor range for each inquiry a-N.

Referring back to FIG. 2, a matrix analysis (block 14) is performed to determine normalized values for each core characteristic. In a preferred embodiment, the matrix analysis is accomplished with a computer, for example, using the routine disclosed in the attached appendix. In addition, a database provides a convenient way to capture information and keep the information segmented. Of course, other methods of performing the matrix analysis are possible such as accomplishing the matrix analysis in an operators head.

Figures 1, 8A:
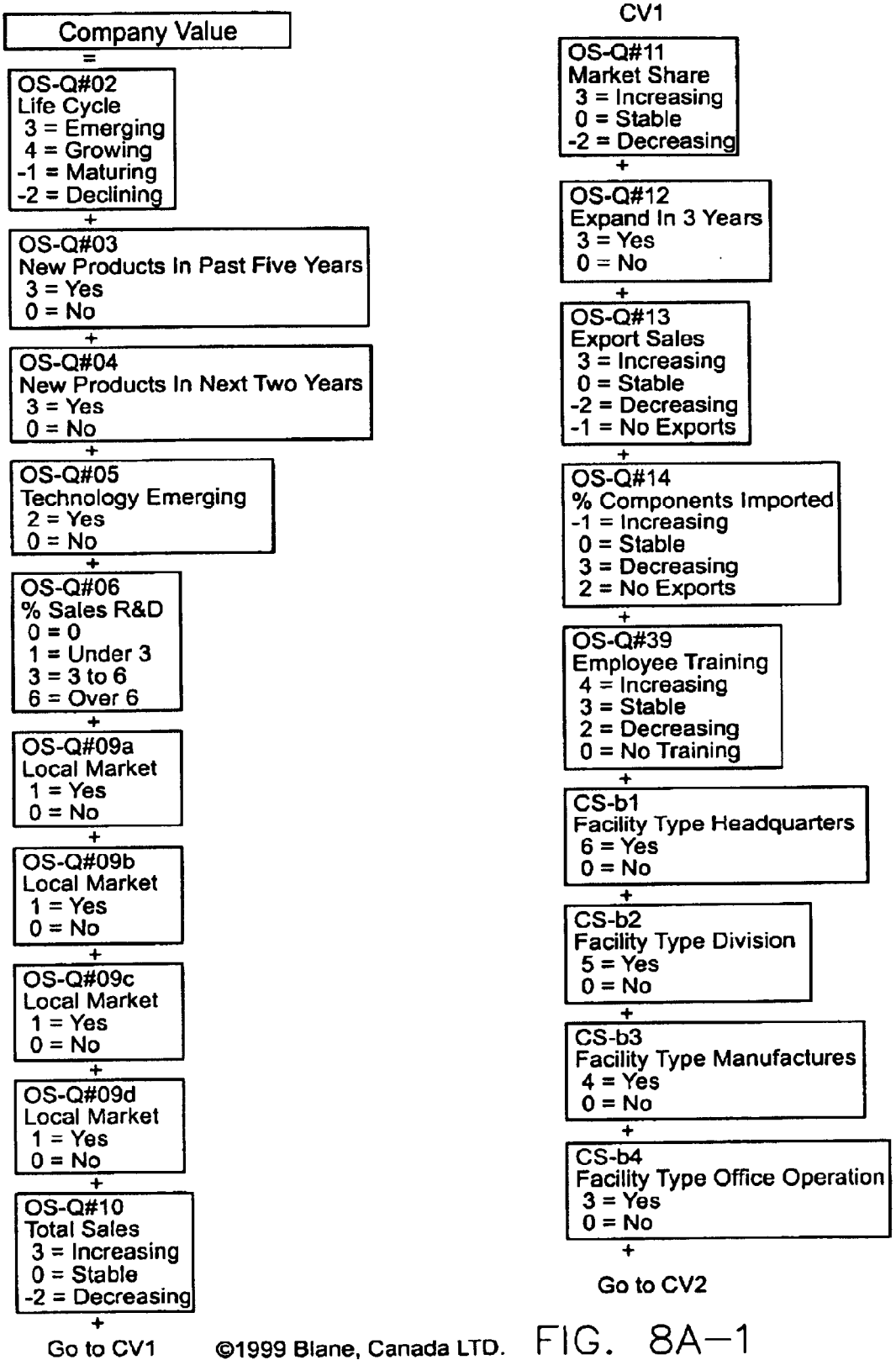
FIGS. 8A–8D show exemplary information inquiries and weight factors for the answers to the information inquiries according to the matrix analysis of the present invention.

Referring to FIGS. 8A–8D, exemplary information inquiries and weight factors for the answers are shown. Referring to FIG. 8A, for example, analysis of the core characteristic company value considers answers from fifteen questions raised in the on site survey form (OS) and seventeen questions found in the background form (CS). Of course, other combinations of information inquiries can be used depending on the nature of the issues being investigated.

After responses are gathered for the information inquiries, the weight factors are aggregated that correspond the selected answers. After aggregating the weight factor values corresponding to the responses, an aggregated total with a minimum value of −16 to a maximum value of +79 occurs for the core characteristic. Thereafter, the aggregated total is normalized to, for example, a range of 0 to 100 percent, so that different core characteristics are viewed on the same scale. To normalize the aggregated weight factors the following equations are preferred:

$$\text{normval} = \text{Int}(((agg amt + \text{adjust})/\text{high} amt + \text{adjust}) * 100)$$

where normval is the normalized aggregated total of 0 to 100 percent;

aggamt is the total aggregation of weight factors;

adjust is an integer that sets the minimum total value to zero; and highamt is the maximum total value that is possible.

Figures 1, 8B:
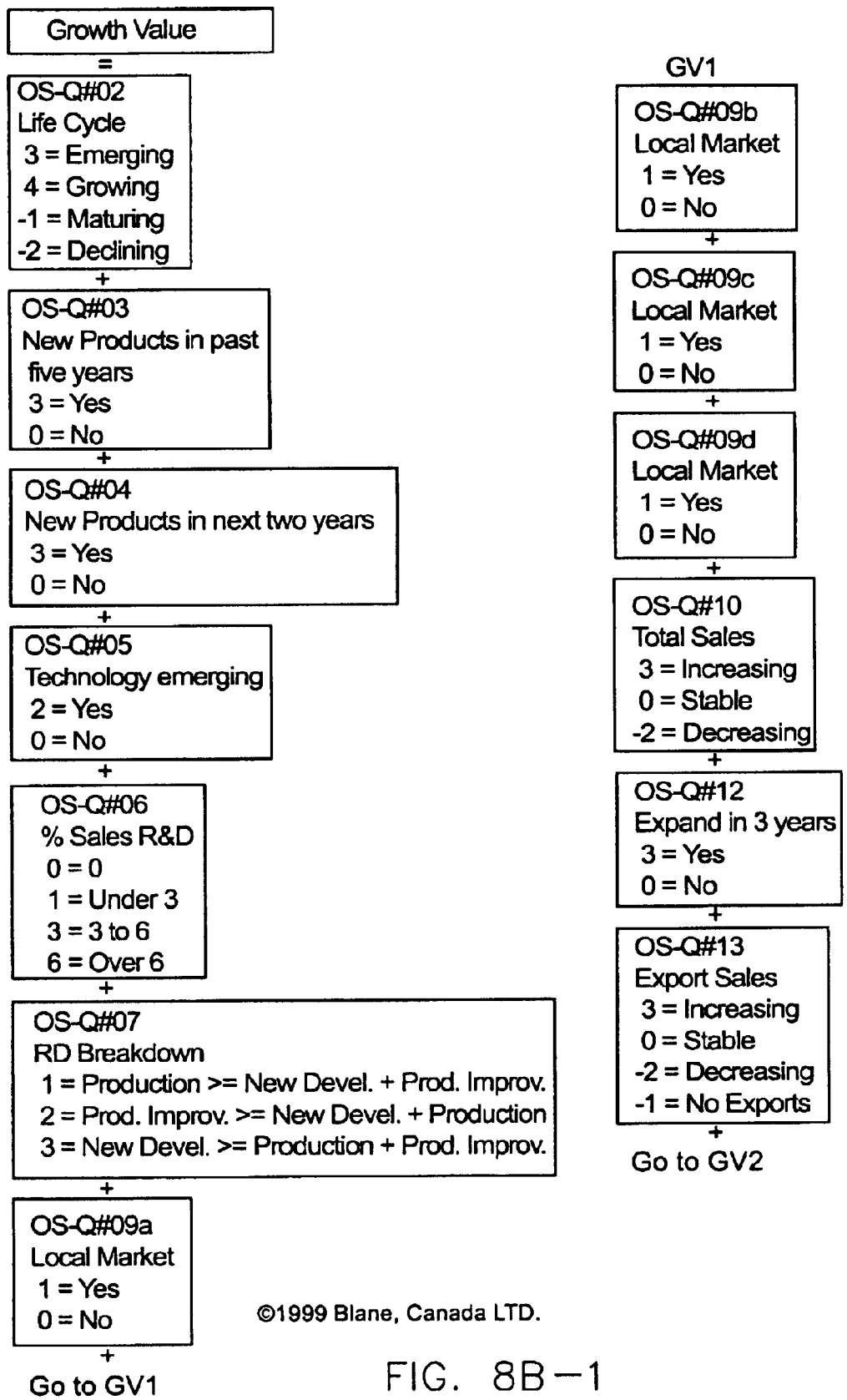
Figures 1, 8C:
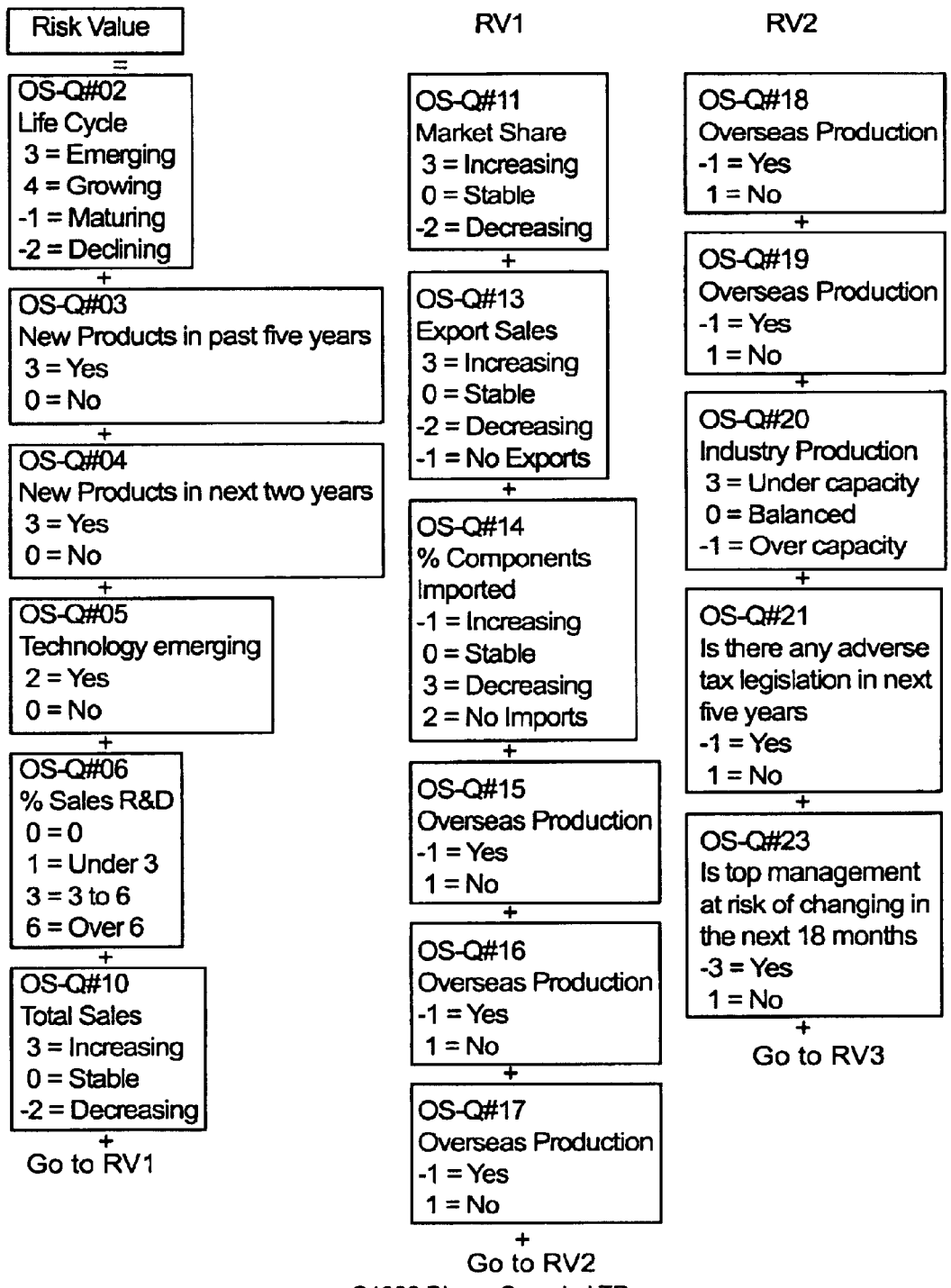
Figures 2, 8C:
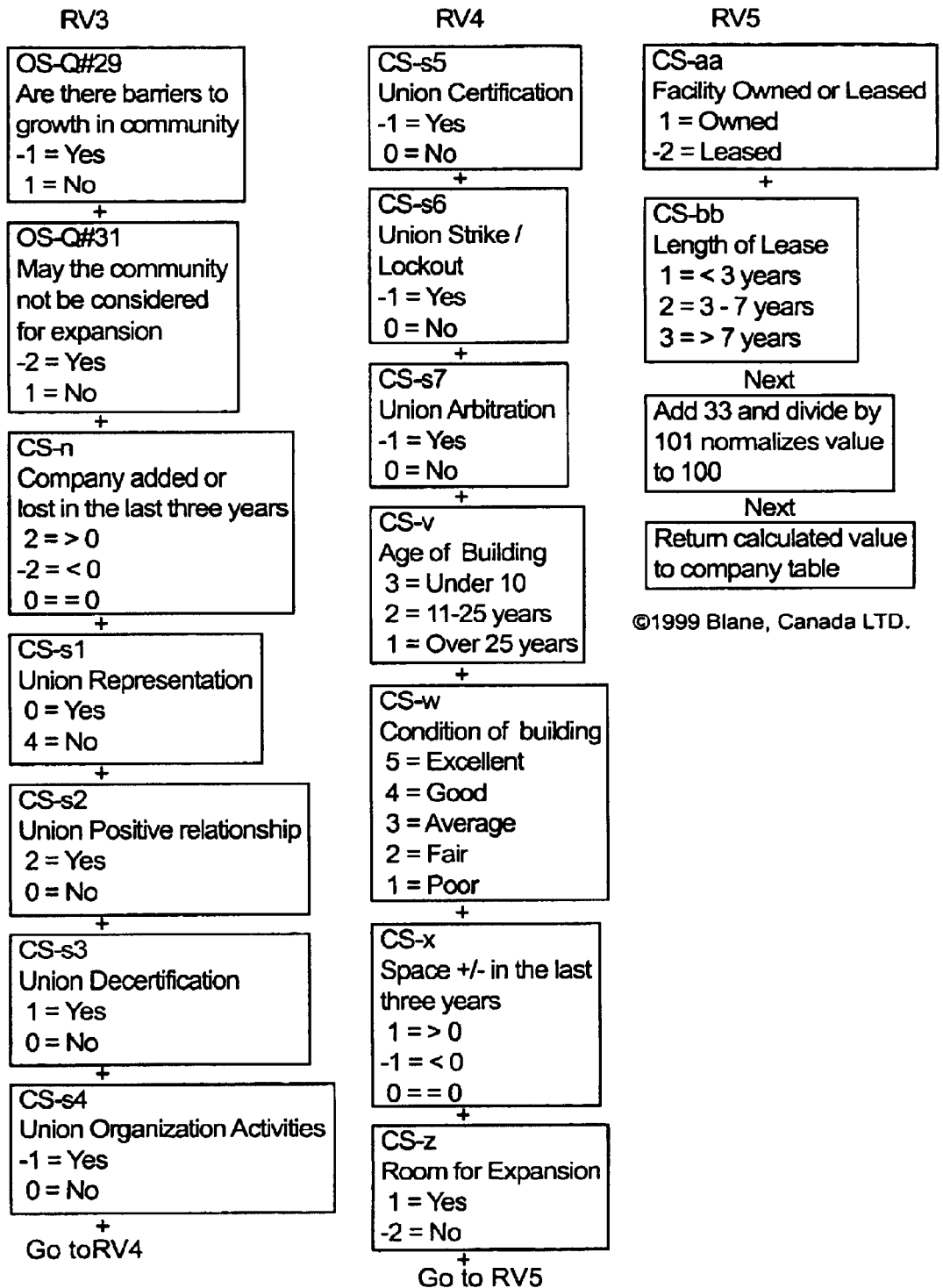
Figures 2, 8D:
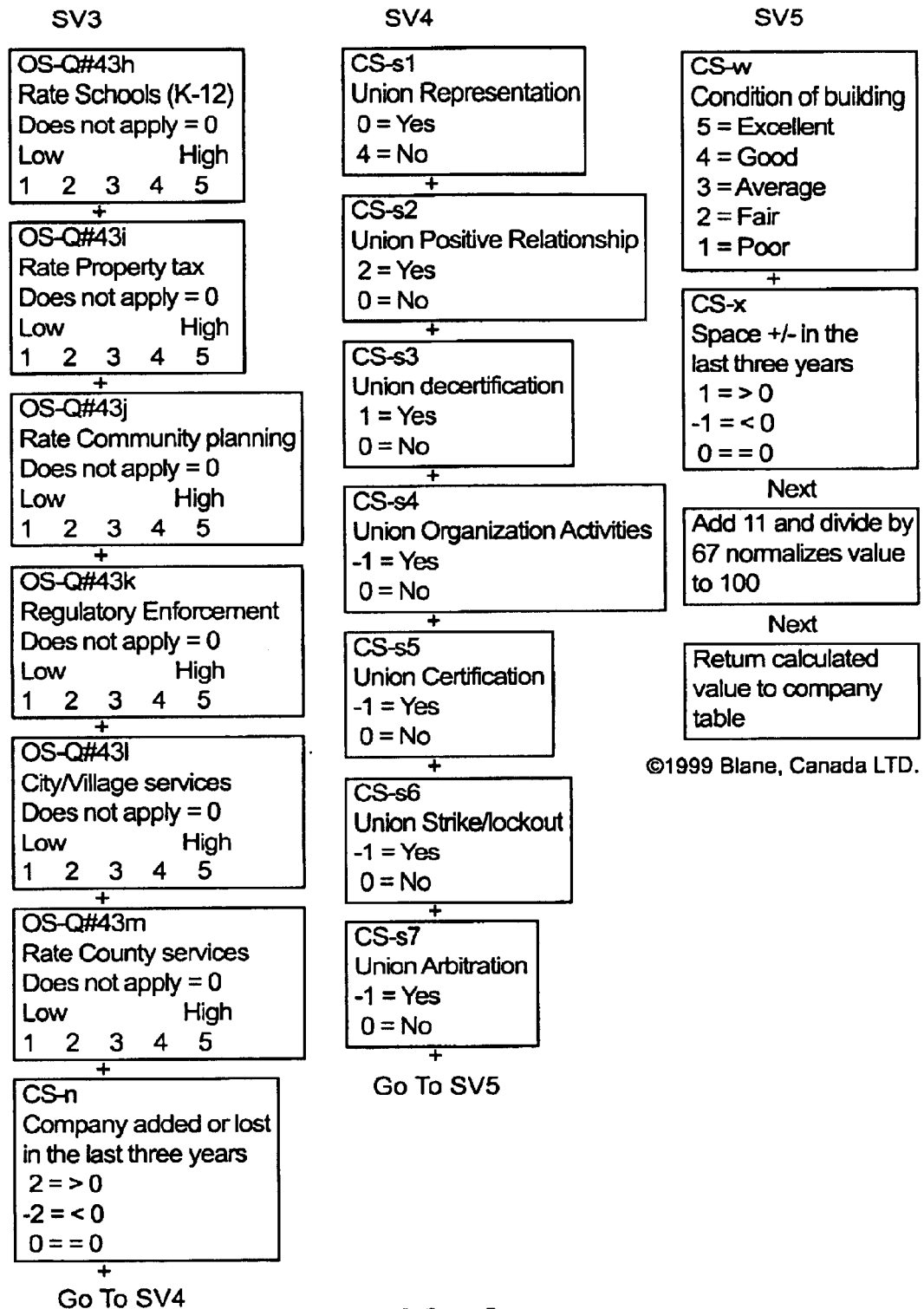

Thus, a high normalized value, e.g., 90–100, indicates that the company is very valuable to the community, and a low normalized value indicates the company adds little value to the community. Referring to FIGS. 8B–8D, this analysis repeats for each of the core characteristics.

Referring back to FIG. 2, after the normalized values are computed for all of the core characteristics, reports are generated (block 16). The reports include a company report (block 18), a major employers report (block 20), a business directory report (block 22), and other reports including a labor analysis report, a business change report and an early warning report. The reports utilize conclusions drawn from the matrix analysis of the present invention and information contained on the on site visit report form, the background report form and the post interviewing report form.

Referring to FIGS. 9A–9C, exemplary analysis reports are shown. Referring to FIG. 9A, a bar chart shows results of the matrix analysis calculations for the four exemplary core characteristics, e.g., value rating, growth potential, risk analysis and satisfaction rating. Since the results were normalized, the results are shown as a percentile, a bar being black up to the level of the value calculated for the subject, e.g., the company. The remainder of the bar is blank to the total of 100, and the percentile number is shown adjacent to the bar.

Referring to FIG. 9B, a company table is shown which list the subjects, for example, in alphabetical order, and identifies the companies' percentile rating for each core characteristic. In addition, the company table can be sorted by each of the core characteristics, e.g., value, growth, risk and satisfaction. Referring to FIG. 9C, a cluster analysis is shown. The letters located in the bar indicate the different companies, and the position of the letters in a bar indicates the percentile rating for that company corresponding to the core characteristic. When a high number of companies are involved, the cluster analysis is replaced by the company table (FIG. 9B) sorted for each core characteristic, since the cluster analysis becomes unreadable.

From the foregoing description, it should be understood that an improved method of matrix analysis has been shown and described which has many desirable attributes and advantages. Conclusions for the core characteristics are represented by a number calculated using the matrix analysis of the present invention. By giving the core characteristic a numeric value, quick assessment of a subject becomes possible, as well as the subject's relationship to others in the group. Moreover, subjective information becomes objective benchmarks for comparison.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed is:

1. A method for evaluating a relative importance to a business entity a predefined subject of predefined core characteristics to access the benefit of a company to a community, comprising:

storing in a database a first data set containing a plurality of predefined core characteristics that describe the subject;

storing in the database a second data set containing information inquiries, wherein each information inquiry is related to one or more of the predefined core characteristics;

correlating each information inquiry to one or more of the predefined core characteristics to determine a hierarchy of information inquiries;

linking each information inquiry to at least one of the predefined core characteristics by degree of importance and determining a linking factor for each information inquiry;

applying a weighting factor to each information inquiry, wherein each weighting factor is selected depending upon the position of the information inquiry in the hierarchy;

electronically calculating a numerical value for each information inquiry using the linking factor and the weighting factor;

performing matrix analysis using the first and second data sets to generate an importance value for each predefined core characteristic;

using the importance values to assess whether the company benefits the community;

wherein the predefined core characteristics comprise at least one of community value information, growth potential information, community satisfaction information, and marketing opportunity information; and identifying the business entity with a geographic region; and correlating the first data set for each predefined core characteristic by geographic region.

2. The method of claim 1, wherein the step of creating the second data set comprises the step of:

creating a survey containing the information inquiries; and collecting responses to each information inquiry.

3. A computer-implemented method for analyzing survey results collected from a population of individuals to determine whether a company benefits a community, comprising:

storing in a database a plurality of predefined core characteristics;

storing in the database a plurality of information inquiries, wherein the information inquiries comprise background information and survey information;

storing in the database a plurality of background statistics for each individual in the population;

associating selected ones of the information inquiries with each of the plurality of predefined core characteristics, wherein the predefined core characteristics comprise at least one of community value information, growth potential information, community satisfaction information, and marketing opportunity information;

associating selected ones of the plurality of background information statistics with each of the plurality of predefined core characteristics;

assigning a numerical value to each of the plurality of information inquiries and to each of the plurality of background information statistics;

inputting responses for each of the plurality of information inquiries;

electronically determining a numerical value for each predefined core characteristic using the numerical value for each associated information inquiry and each associated background information statistic;

for each individual in the population outputting a normalized value for each predefined core characteristic, wherein the normalized values are used to assess whether the company benefits the community, wherein the population of individuals comprise a plurality of business entities;

identifying each of the plurality of business entities with a geographic region; and correlating the numerical value for each predefined core characteristic by geographic region.

4. The method of claim 3, wherein the step of assigning a numerical value comprises the steps of:

relating the relative importance of each information inquiry to each of the plurality of predefined core characteristics to create a hierarchy; and determining a weighting factor for each possible response to each information inquiry based on the position of each response in the hierarchy.

5. The method of claim 3, wherein the step of determining a numerical value for each predefined core characteristic comprises the step of summing the numerical values for each associated response and for each associated background information statistic.

6. The method of claim 3, wherein the step of associating selected ones of the information inquiries with each of the plurality of predefined core characteristics further comprises the step of linking each information inquiry to at least one of the predefined core characteristic by degree of importance and determining a linking factor for each information inquiry, and wherein the step of determining a numerical value further comprises the step of using the linking factor.

7. The method of claim 3, wherein the step of associating selected ones of the plurality of background information statistics with each of the plurality of predefined core characteristics further comprises the step of linking each background information statistic to at least one of the predefined core characteristic by degree of importance and determining a linking factor for each background information statistic, and wherein the step of determining a numerical value further comprises the step of using the linking factor.

8. The method of claim 3, wherein the step of outputting a normalized value comprises the steps of:

determining a common denominator by summing all numerical values for all individuals in the population for each predefined core characteristic; and dividing the numerical value for each predefined core characteristic by the common denominator.

9. A computer-implemented method for analyzing the relative importance of predefined core characteristics of a subject to individuals within a group to determine whether a company benefits a community, comprising:

storing in a database a plurality of predefined core characteristics of the subject, wherein the predefined core characteristics comprise at least one of community value information, growth potential information, community satisfaction information, and marketing opportunity information, wherein the subject comprises business retention, and;

introducing a background information for each individual;

defining information inquiries, wherein the information inquiries comprise the background information and survey information;

correlating the information inquiries to the predefined core characteristics to determine a hierarchy of information inquiries;

linking each information inquiry to at least one of the predefined core characteristic and determining a linking factor for each information inquiry;

applying weighting factors to the information inquiries;

electronically calculating a numerical value for each information inquiry using the linking factor and the weighting factor;

collecting responses to the information inquiries;

for each individual, calculating a numerical value for each of the predefined core characteristics and displaying the numerical value, wherein the numerical values are used to assess whether the company benefits the community, wherein the individuals comprise business entities; and identifying each of the plurality of business entities with a geographic region; and correlating the data set for each predefined core characteristic by geographic region.

10. The method of claim 9 further comprising the step of outputting for each individual a normalized value for each predefined core characteristic.

11. The method of claim 9, wherein the step of calculating a numerical value for each of the predefined core characteristics comprises the steps of:

creating a data set for each predefined core characteristic, wherein each data set includes the associated responses and associated background information statistics; and computing rating values for each predefined core characteristic using the data set for that predefined core characteristic.

* * * * *